United States Patent
Wang et al.

(10) Patent No.: US 11,444,318 B2
(45) Date of Patent: Sep. 13, 2022

(54) GARNET-TYPE LITHIUM-ION SOLID-STATE CONDUCTOR

(71) Applicant: Samsung Electronics Co., Ltd., Suwon-si (KR)

(72) Inventors: Yan Wang, Brookline, MA (US); Lincoln Miara, Lincoln, MA (US); Sang Bok Ma, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 366 days.

(21) Appl. No.: 16/541,255

(22) Filed: Aug. 15, 2019

(65) Prior Publication Data
US 2020/0227775 A1 Jul. 16, 2020

Related U.S. Application Data

(60) Provisional application No. 62/791,476, filed on Jan. 11, 2019.

(51) Int. Cl.
| | |
|---|---|
| *H01M 10/0562* | (2010.01) |
| *H01M 10/0525* | (2010.01) |
| *C01G 27/00* | (2006.01) |
| *H01M 50/409* | (2021.01) |

(52) U.S. Cl.
CPC ...... *H01M 10/0562* (2013.01); *C01G 27/006* (2013.01); *H01M 10/0525* (2013.01); *H01M 50/409* (2021.01); *H01M 2300/0071* (2013.01)

(58) Field of Classification Search
CPC ......... H01M 10/0562; H01M 10/0525; H01M 50/409; H01M 2300/0071
See application file for complete search history.

(56) References Cited

U.S. PATENT DOCUMENTS

| | | | |
|---|---|---|---|
| 9,559,396 B2 | 1/2017 | Lee et al. | |
| 9,997,270 B2 | 6/2018 | Hamamoto et al. | |
| 2013/0266842 A1 | 10/2013 | Woehrle et al. | |
| 2013/0295469 A1* | 11/2013 | Liang | H01M 4/485 429/335 |
| 2014/0154586 A1* | 6/2014 | Hayashi | H01M 10/4235 429/322 |
| 2015/0171463 A1* | 6/2015 | Liang | H01M 10/0562 429/322 |
| 2016/0141580 A1* | 5/2016 | Sommer | H01M 10/054 429/144 |
| 2018/0191028 A1 | 7/2018 | Allenic et al. | |
| 2018/0269526 A1 | 9/2018 | Takeuchi et al. | |

FOREIGN PATENT DOCUMENTS

JP 2013-037992 A * 2/2013 ......... H01M 10/0562

* cited by examiner

*Primary Examiner* — Osei K Amponsah
(74) *Attorney, Agent, or Firm* — Cantor Colburn LLP (57) ABSTRACT

Disclosed is a solid state electrolyte comprising a compound of Formula 1

$$Li_{7-a^*\alpha-(b-4)^*\beta-x}M^a{}_\alpha La_3 Hf_{2-\beta}M^b{}_\beta O_{12-\delta}X_x \qquad (1)$$

wherein
$M^a$ is a cationic element having a valence of a+;
$M^b$ is a cationic element having a valence of b+; and
X is an anion having a valence of −1,
wherein, when $M^a$ includes H, $0 \le \alpha \le 5$, otherwise $0 \le \alpha \le 0.75$, and wherein $0 \le \beta \le 1.5$, $0 \le x \le 1.5$, and $(a^*\alpha + (b-4)\beta + x) > 0$, $0 \le \delta \le 1$.

25 Claims, 5 Drawing Sheets

GARNET-TYPE LITHIUM-ION SOLID-STATE CONDUCTOR

CROSS-REFERENCE TO RELATED APPLICATION

This application claims priority to U.S. Provisional Patent Application No. 62/791,476, filed on Jan. 11, 2019, in the United States Patent and Trademark Office, and all the benefits accruing therefrom under 35 U.S.C. § 119, the content of which is incorporated herein in its entirety by reference.

BACKGROUND

1. Field

Disclosed is a garnet-type lithium-ion solid-state conductor, methods of synthesis thereof, an electrode and a battery including the solid-state conductor, and methods of manufacture thereof.

2. Description of the Related Art

Lithium batteries are of interest because they can potentially offer improved specific energy and energy density, improved safety, and in some configurations improved power density. However, currently available materials are not sufficiently stable to lithium metal. Desired is a material that would permit the use of high-voltage positive electrode materials and low-voltage negative electrode materials such as lithium metal, and provide high power density. The lithium conductivity of available solid-state materials is significantly less than liquid alternatives. Thus there remains a need for an improved lithium-ion conducting solid-state material, and an electrochemical cell including the same.

SUMMARY

Disclosed is a solid state electrolyte comprising a compound of Formula 1

$$Li_{7-a^*\alpha-(b-4)^*\beta-x}M^a_\alpha La_3 Hf_{2-\beta} M^b_\beta O_{12-x-\delta} X_x \quad (1)$$

wherein
$M^a$ is a cationic element having a valence of a+;
$M^b$ is a cationic element having a valence of b+; and
X is an anion having a valence of −1,
wherein, when $M^a$ includes H, $0 \le \alpha \le 5$, otherwise $0 \le \alpha \le 0.75$, and wherein $0 \le \beta \le 1.5$, $0 \le x \le 1.5$, and $(a^*\alpha+(b-4)\beta+x) > 0$, $0 \le \delta \le 1$.

Also disclosed is a particle including: the solid state electrolyte of claim 1; and a liquid electrolyte within a pore of the particle.

Also disclosed is a solid state electrolyte including: a core including a first solid state electrolyte; and a shell including the compound of Formula 1 on the core, wherein the first solid state electrolyte and the compound of Formula 1 are different.

Also disclosed is a porous separator for a battery, the separator including: a porous substrate, and the compound of Formula 1 on the substrate.

Also disclosed is a protected negative electrode, the electrode comprising lithium metal and the solid state electrolyte directly on the lithium metal.

Also disclosed is a positive active material for a lithium battery, the positive active material including: a lithium transition metal oxide; and the solid state electrolyte on the lithium transition metal oxide.

Also disclosed is a battery including: a positive electrode; a negative electrode; and the solid state electrolyte between the positive electrode and the negative electrode.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Disclosed is a solid-state lithium-ion conducting material having improved stability and improved ionic conductivity. The material may be used to provide a solid-state separator, e.g., to electrically separate a positive electrode and a negative electrode of a lithium-ion or a lithium metal battery. In an aspect, the material may be used as protection layer on lithium metal to provide a protected lithium-metal negative electrode having improved stability. In an aspect, the material is an Hf-containing garnet-type oxide material and provides an improved combination of conductivity and stability against lithium metal.

Disclosed is a solid state electrolyte comprising a compound of Formula 1

$$Li_{7-a^*\alpha-(b-4)^*\beta-x}M^a_\alpha La_3 Hf_{2-\beta} M^b_\beta O_{12-x-\delta} X_x \quad (1)$$

wherein $M^a$ is a cationic element having a valence of a+; $M^b$ is a cationic element having a valence of b+; and X is an anion having a valence of −1, wherein, when $M^a$ comprises H, 0≤α≤5, otherwise 0≤α≤0.75, and wherein 0≤β≤1.5, 0≤x≤1.5, and a*α+(b−4)β+x>0, 0≤δ≤1.

$M^a$ may be a monovalent element, a divalent element, a trivalent element, or a tetravalent element. In an aspect, a is 1 and $M^a$ is monovalent and is H, Na, K, Rb, or a combination thereof, thus $M^a$ may comprise $H^-$, $Na^+$, $K+$, $Rb+$, or a combination thereof. In an aspect, a is 2 and $M^a$ is divalent and is Be, Mg, Ca, Sr, Ba, or a combination thereof. Thus $M^a$ may comprise $Be^{2+}$, $Mg^{2+}$, $Ca^{2-}$, $Sr^{2+}$, $Ba^{2-}$, or a combination thereof. In an aspect, a is 3, and $M^a$ is trivalent and comprises B, Al, Ga, In, Sc, Y, La, Ce, Pr, Nd, or a combination thereof. Thus $M^a$ may comprise $B^{3+}$, $Al^{3+}$, $Ga^{3+}$, $In^{3+}$, $Sc^{3+}$, $Y^{3+}$, $La^{3+}$, $Ce^{3+}$, $Pr^{3+}$, $Nd^{3+}$, or a combination thereof. In an aspect, a is 4, and $M^a$ is tetravalent and is Zr, Ti, Sn, Si, Ge, Pb, or a combination thereof. Thus $M^a$ may be $Zr^{4+}$, $Ti^{4+}$, $Sn^{4+}$, $Si^{4+}$, $Ge^{4-}$, $Pb^{4+}$, or a combination thereof.

A content α of $M^a$ in Formula 1 may be 0≤α≤5, 0<α<5, 0.1≤α≤4, or 0.2≤α≤3 when $M^a$ comprises H. Otherwise, e.g., when $M^a$ is other than H, i.e., a divalent element, a trivalent element, or a tetravalent, a content α of $M^a$ in Formula 1 may be 0≤α≤0.75, 0<α<0.75, 0.1≤α≤0.7, 0.2≤α≤0.6, or 0.3≤α≤0.5.

While not wanting to be bound by theory, it is understood that in the structure of the compound of Formula 1, $M^a$ resides on a lithium crystallographic site. It is observed that when the compound adopts a structure in which $M^a$ resides on a lithium crystallographic site, the lithium-ion conductivity and stability are improved.

In an aspect, $M^b$ in Formula 1 is a divalent element, a trivalent element, a tetravalent element, or a pentavalent element. In an aspect, b is 2 and $M^b$ is divalent and is Be, Mg, Ca, Sr, Ba, or a combination thereof. Thus $M^b$ may comprise $Be^{2+}$, $Mg^{2+}$, $Ca^{2+}$, $Se^+$, $Ba^{2+}$, or a combination thereof. In an aspect, b is 3 and $M^b$ is trivalent and is B, Al, Ga, In, Sc, Y, La, Ce, Pr, Nd, or a combination thereof. Thus $M^b$ may comprise $B^{3+}$, $Al^{3+}$, $Ga^{3+}$, $In^{3+}$, $Sc^{3+}$, $Y^{3+}$, $La^{3+}$, $Ce^{3+}$, $Pr^{3+}$, $Nd^{3+}$, or a combination thereof. In an aspect, b is 4 and $M^b$ is tetravalent and is Zr, Ti, Sn, Si, Ge, Pb, or a combination thereof. Thus $M^b$ may comprise $Zr^{4+}$, $Ti^{4+}$, $Sn^{4+}$, $Si^{4+}$, $Ge^{4+}$, $Pb^{4+}$, or a combination thereof. In an aspect, b is 5 and $M^b$ is pentavalent and is V, Ta, Nb, or a combination thereof. Thus $M^b$ may comprise $V^{5+}$, $Ta^{5+}$, $Nb^{5+}$, or a combination thereof. In an aspect, b is 6 and $M^b$ is hexavalent and is Cr, Mo, W, or a combination thereof. Thus $M^b$ may comprise $Cr^{6+}$, $Mo^{6+}$, $W^{6-}$, or a combination thereof.

A content β of $M^b$ in Formula 1 may be 0≤β≤1.5, 0≤β≤1.5, 0.1≤β≤1.4, 0.2≤β≤1.3, 0.3≤β≤1.2. Also, $M^a$ and $M^b$ may be different.

While not wanting to be bound by theory, it is understood that in the structure of the compound of Formula 1, $M^b$ resides on a hafnium crystallographic site. It is observed that when the compound adopts a structure in which $M^b$ resides on a hafnium crystallographic site, the lithium-ion conductivity and stability are improved.

In an aspect X in Formula (1) is F, Cl, Br, I, or a combination thereof. Use of fluorine, $F^-$, i.e., having a valence of −1, is mentioned. A content x of the anion X in the compound of Formula 1 may be 0≤x≤1.5, 0<x<1.5, 0.1≤x≤1.4, or 0.2≤x≤1.3.

Also, the compound of Formula 1 may comprise an oxygen defect. An oxygen defect content δ in Formula 1 may be 0≤δ≤1, 0<δ<1, 0.1≤δ≤0.9, or 0.2≤δ≤0.8. While not wanting to be bound by theory, it is understood that including an oxygen defect in the compound of Formula 1 provides improved ionic conductivity.

In the compound of Formula 1, (a*α+(b−4)β+x)>0. For example, 0<(a*α+(b−4)β+x)<1, 0.1<(a*α+(b−4)β+x)<0.8, or 0.2<(a*α+(b−4)β+x)<0.6.

The compound of Formula 1 may be in the form of a particle. The particle can have, for example, a spherical form, an oval-spherical form, or the like. The particle diameter is not particularly limited, and a mean particle diameter ranging, for example, from 0.01 to 50 μm, for example, 0.1 to 25 μm, or 0.2 μm to 10 μm is mentioned. A mean particle diameter refers to a number average diameter (D50) of the particle size distribution of particles obtained by scattering, or the like. The particle can be processed, for example, by mechanical milling, to provide a suitable particle size.

The particle comprising the compound of Formula 1 may comprise a gradient of $M^b$, wherein the gradient is in a direction from a center of the particle to a surface of the particle. A content of $M^b$, if present, may vary such that a content of $M^b$ is decreases in a direction from a center of the particle towards a surface of the particle. For example, a ratio of a concentration of Hf to $M^b$ on a surface of the particle is greater than a ratio of a concentration of Hf to $M^b$ in a center of the particle. In an aspect, wherein $M^b$ is Zr, a ratio of a concentration of Hf to Zr on a surface of the particle is greater than a ratio of a concentration of Hf to Zr in a center of the particle. Also, a concentration of Hf may increase in a direction from a center of the particle to a surface of the particle. In an aspect, a content of Hf in a center of the particle is zero, and increases in a direction to a surface of the particle.

In an aspect, the particle comprising the compound of Formula 1 may be porous. The porous structure of the particle can refer to a particle having micro- and/or nano-structural features, e.g., microporosity and/or nanoporosity. For example, the porosity of the solid electrolyte comprising the compound of Formula 1 can be 10% to 90%, or 20% to 80%, or 30% to 70%. As used herein, "pores" can also refer to "voids." Also, a pore size of the pores of particle comprising the compound of Formula 1 may be 0.1 μm to 50 μm, 2 μm to 40 μm, or 5 μm to 30 μm.

A liquid electrolyte may be disposed in a pore of the particle. In an aspect, the liquid electrolyte is disposed in a pore of the particle comprising the compound of Formula 1. The liquid electrolyte may comprise a polar aprotic solvent and a lithium salt. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any suitable solvent can be used. In an embodiment, the solvent preferably comprises a carbonate ester, and more preferably comprises ethylene carbonate and propylene carbonate.

The lithium salt may comprise $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, LiAlCl$_4$, LiN(C$_x$F$_{2x+1}$SO$_2$)(C$_y$F$_{2y+1}$SO$_2$) in which the x and y are natural numbers, e.g., an integer of 1 to 20, LiCl, LiI, LiB(C$_2$O$_4$)$_2$, lithium bis(fluorosulfonyl)imide, or a combination thereof. The concentration of the lithium salt may be 0.1 to 2 molar (M), e.g., 0.5 to 1.3 M in the aprotic solvent.

In an aspect, a solid state electrolyte comprises a core comprising a first solid state electrolyte; and a shell comprising the compound of Formula 1 on the core, wherein the first solid state electrolyte and the compound of Formula 1 are different. The first solid state electrolyte may comprise a sulfide solid electrolyte, or an additional solid electrolyte.

The sulfide solid electrolyte may comprise Li$_2$S—P$_2$S$_5$, Li$_2$S—P$_2$S$_5$—LiX, wherein X is a halogen element, Li$_2$S—P$_2$S$_5$—Li$_2$O, Li$_2$S—P$_2$S$_5$13 Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$, wherein m and n are positive numbers, Z is one of Ge, Zn or Ga, Li$_2$S—GeS$_2$, Li$_2$S—SiS$_2$—Li$_3$PO$_4$, Li$_2$S—SiS$_2$—Li$_p$M$^1$O$_q$ wherein p and q are positive numbers, M$^1$ is P, Si, Ge, B, Al, Ga, or In, Li$_{7-x}$PS$_{6-x}$Cl$_x$ wherein 0<x<2, Li$_{7-x}$PS$_{6-x}$Br$_x$ wherein 0<x<2, or Li$_{7-x}$PS$_{6-x}$I$_x$ wherein 0<x<2. Mentioned are Li$_6$PS$_5$Cl, Li$_6$PS$_5$Br, or Li$_6$PS$_5$I.

The additional oxide solid electrolyte may comprise Li$_{1-x+y}$Al$_x$Ti$_{2-x}$Si$_y$P$_{3-y}$O$_{12}$ wherein 0<x<2, 0≤y≤3, BaTiO$_3$, Pb(Zr$_{(1-x)}$Ti$_x$)O$_3$ wherein 0≤x≤1, Pb$_{1-y}$La$_y$Zr$_{1-y}$Ti$_y$O$_3$ wherein 0≤x≤1, 0≤y≤1, Pb(Mg$_{1/3}$Nb$_{2/3}$)O$_3$–PbTiO$_3$, HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, SiC, Li$_3$PO$_4$, Li$_x$Ti$_y$(PO$_4$)$_3$ wherein 0<x<2,0<y<3), Li$_x$Al$_y$Ti$_z$(PO$_4$)$_3$, 0<x<2, 0<y<1, 0<z<3), Li$_{1+x+y}$(Al$_{(1-m)}$Ga$_m$)$_x$(Ti$_{(1-n)}$Ge$_n$)$_{2-x}$Si$_y$P$_{3-y}$O$_{12}$ (0≤x≤1, 0<y<1, 0≤m≤1, and 0≤n≤1, Li$_x$La$_y$TiO$_3$ wherein 0<x<2, 0<y<3, Li$_x$Ge$_y$P$_z$S$_w$ wherein 0<x<4, 0<y<1, 0<z<1, and 0<w<5, Li$_x$N$_y$ wherein 0<x<4 and 0<y<2, SiS$_2$, Li$_x$Si$_y$S$_z$ wherein 0<x<3, 0<y<2, 0<z<4, Li$_x$P$_y$S$_z$ wherein 0<x<3, 0<y<3 and 0<z<7, Li$_2$O, LiF, LiOH, Li$_2$CO$_3$, LiAlO$_2$, a Li$_2$O—Al$_2$O$_3$—SiO$_2$—P$_2$O$_5$—TiO$_2$—GeO$_2$ ceramic, a garnet ceramic of the formula Li$_{3+x}$La$_3$M$^1_2$O$_{12}$ wherein M$^1$ is Te, Nb or Zr and x is an integer of 1 to 10, or a combination thereof. Mentioned is (La$_{1-x}$Li$_x$)TiO$_3$ (LLTO) wherein 0<x<1.

The additional oxide solid electrolyte may comprise an oxide of the formula Li$_{5+x}$E$_3$(Me$^2_z$Me$^2_{(2-z)}$)O$_d$ wherein E is a trivalent cation; Me$^1$ and Me$^2$ are each independently one of a trivalent, tetravalent, pentavalent, and a hexavalent cation; 0<x≤3, 0≤z<2, and 0<d≤12; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when 0<x≤2.5, E may be La and Me$^2$ can be Zr. In an aspect, the oxide can be of the formula Li$_{5+x+2y}$(D$_y$E$_{3-y}$) (Me$^1_z$Me$^2_{2-z}$)O$_d$ wherein D is a monovalent or divalent cation; E is a trivalent cation; Me$^1$ and Me$^2$ are each independently a trivalent, tetravalent, pentavalent, or a hexavalent cation; 0<x+2y≤3, 0<y≤0.5, 0≤z<2, and 0<d≤12; and O can be partially or totally substituted with a pentavalent anion, a hexavalent anion, a heptavalent anion, or a combination thereof. The preferred number of moles of lithium per formula unit (Li-pfu) in the above formula is 6<(5+x+2y)<7.2, 6.2 <(5+x+2y)<7, 6.4<(5+x+2y)<6.8. In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), zinc (Zn), or chromium (Cr). Mentioned is Li$_{6.5}$La$_3$Zi$_{1.5}$Ta$_{0.5}$O$_{12}$.

Disclosed is a separator, e.g., for a battery, or other electrochemical device. The separator may comprise a layer comprising the compound of Formula 1 between a positive electrode and a negative electrode. In an aspect the separator is porous.

A porous separator may comprise a porous substrate, and the compound of Formula 1 on the substrate. The porous separator may be a microporous polyolefin. The separator may comprise a glass fiber, polyester, polyethylene, polypropylene, polytetrafluoroethylene (PTFE), or a combination thereof. The separator may comprise a microporous polymeric film, such as a microporous polyethylene or microporous polypropylene film. The separator may comprise the solid-state electrolyte and a porous olefin film such as polyethylene and polypropylene. A diameter of a pore of the porous olefin film can be 0.01 to 10 micrometers (μm), and a thickness of the separator can be in a range of 5 to 300 μm.

Also disclosed is a protected negative electrode comprising the compound of Formula 1 on the negative electrode active material. In an aspect, the negative electrode active material comprises lithium metal, a lithium alloy, or a combination thereof. Mentioned is a negative electrode comprising lithium metal having a protection layer comprising compound of Formula 1 directly thereon.

Also disclosed is a protected positive active material comprising the compound of Formula 1 on the positive active material. In an aspect, the positive active material comprises a lithium transition metal oxide. Mentioned is a positive active material comprising a particle of the transition metal oxide having a protection layer comprising compound of Formula 1 directly thereon. While not wanting to be bound by theory, it is understood that the compound of Formula 1 is effective to protect the positive electrode active material, e.g., to prevent or suppress reaction with the electrolyte.

The positive active material can comprise a lithium transition metal oxide, a transition metal sulfide, or the like. For example, the positive active material can include a composite oxide of lithium and a metal selected from cobalt, manganese, and nickel. For example, the positive active material can be a compound represented by any of the Formulas: Li$_p$M$^1_{1-q}$M$^2_q$D$_2$ wherein 0.90≤p≤1.8 and 0≤q≤0.5; Li$_p$E$_{1-q}$M$^2_q$O$_{2-x}$D$_x$ wherein 0.90≤p≤1.8, 0≤q≤0.5, and 0≤x≤0.05; LiE$_{2-q}$M$^2_q$O$_{4-x}$D$_x$ wherein 0≤q≤0.5 and 0≤x≤0.05; Li$_p$Ni$_{1-q-r}$Co$_q$M$^2_r$D$_x$ wherein 0.90≤p≤1.8, 0≤q≤0.5, 0≤r≤0.05, and 0<x≤2; Li$_p$Ni$_{1-q-r}$Co$_q$M$^2_r$O$_{2-x}$X$_x$ wherein 0.90≤p≤1.8, 0≤q≤0.5, 0≤r≤0.05, and 0≤x≤2; Li$_p$Ni$_{1--q-r}$Co$_q$M$^2_r$O$_{2-x}$X$_x$ wherein0.90≤p≤1.8, 0≤q≤0.5, 0≤r≤0.05, and 0<x<2; Li$_p$Ni$_{1-q-r}$Mn$_q$M$^2_r$D$_x$ wherein 0.90≤p≤1.8, 0≤q≤0.5, 0≤r≤0.05, and 0<x≤2; Li$_p$Ni$_{1-q-r}$Mn$_q$M$^2_r$O$_{2-p}$X$_x$ wherein 0.90≤p≤1.8, 0≤q≤0.5, 0≤r≤0.05, and 0<x<2; Li$_p$Ni$_{1-q-r}$Mn$_q$M$^2_r$O$_{2-p}$X$_x$ wherein 0.90≤p≤1.8, 0≤q≤0.5, 0≤r≤0.05, and 0<x<2; Li$_p$Ni$_q$E$_r$G$_d$O$_2$ wherein 0.90≤p≤1.8, 0≤q≤0.9, 0≤r≤0.5, and 0.001≤d≤0.1; Li$_p$Ni$_q$Co$_r$Mn$_d$GeO$_2$ wherein 0.90≤p≤1.8, 0≤q≤0.9, 0≤r≤0.5, 0≤d≤0.5, and 0.001≤e≤0.1; Li$_p$NiG$_q$O$_2$ wherein 0.90≤p≤1.8 and 0.001≤q≤0.1; Li$_p$CoG$_q$O$_2$ wherein 0.90≤p≤1.8 and 0.001≤q≤0.1; Li$_p$MnG$_q$O$_2$ where 0.90≤p≤1.8 and 0.001≤q≤0.1; Li$_p$Mn$_2$G$_q$O$_4$ wherein 0.90≤p≤1.8 and 0.001≤q≤0.1; QO$_2$; QS$_2$; LiQS$_2$; V$_2$O$_5$; LiV$_2$O$_2$; LiRO$_2$; LiNiVO$_4$; Li$_{(3-f)}$J$_2$(PO$_4$)$_3$ (0≤f≤2); Li$_{(3-f)}$Fe$_2$(PO$_4$)$_3$ wherein $0 \leq f \leq 2$; and LiFePO$_4$, in which in the foregoing positive active materials M$^1$ is Ni, Co, or Mn; M$^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include LiCoO$_2$, LiMn$_x$O$_{2x}$ where x=1 or 2, LiNi$_{1-x}$Mn$_x$O$_{2x}$ where $0<x<1$, LiNi$_{1-x-y}$Co$_x$Mn$_y$O$_2$ where $0 \leq x \leq 0.5$ and $0 \leq y \leq 0.5$, LiFePO$_4$, TiS$_2$, FeS$_2$, TiS$_3$, and FeS$_3$.

Mentioned is an aspect in which the positive active material is a NCA material represented by Li$_x$Ni$_b$E$_z$G$_d$O$_2$ (wherein $0.90 \leq x \leq 1.8$, $0 \leq z \leq 0.9$, $0 \leq z \leq 0.5$, $0.001 \leq d \leq 0.1$, E is Co, Mn, or a combination thereof, and G is Al, Cr, Mn, Fe, Mg, La, Ce, Sr, V, or a combination thereof). In an implementation, the positive active material may include, e.g., lithium cobalt oxide, lithium nickel cobalt manganese oxide, lithium nickel cobalt aluminum oxide, or a combination thereof.

A positive electrode may comprise a layer comprising the positive active material and may further include a conductive agent and a binder. Any suitable conductive agent and binder may be used. A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The negative active material, e.g., lithium metal, may be disposed on a current collector, such as a copper current collector to form a negative electrode.

A positive electrode can be produced from a positive active material composition including a positive active material, and optionally, the conductive agent, and the binder. In an embodiment the positive active material composition is disposed on a current collector, such as an aluminum current collector to form a positive electrode. Screen printing, slurry casting, or powder compression may be used, the details of which may be determined by one of skill in the art without undue experimentation and are not further elaborated upon herein for clarity.

Figure 9:
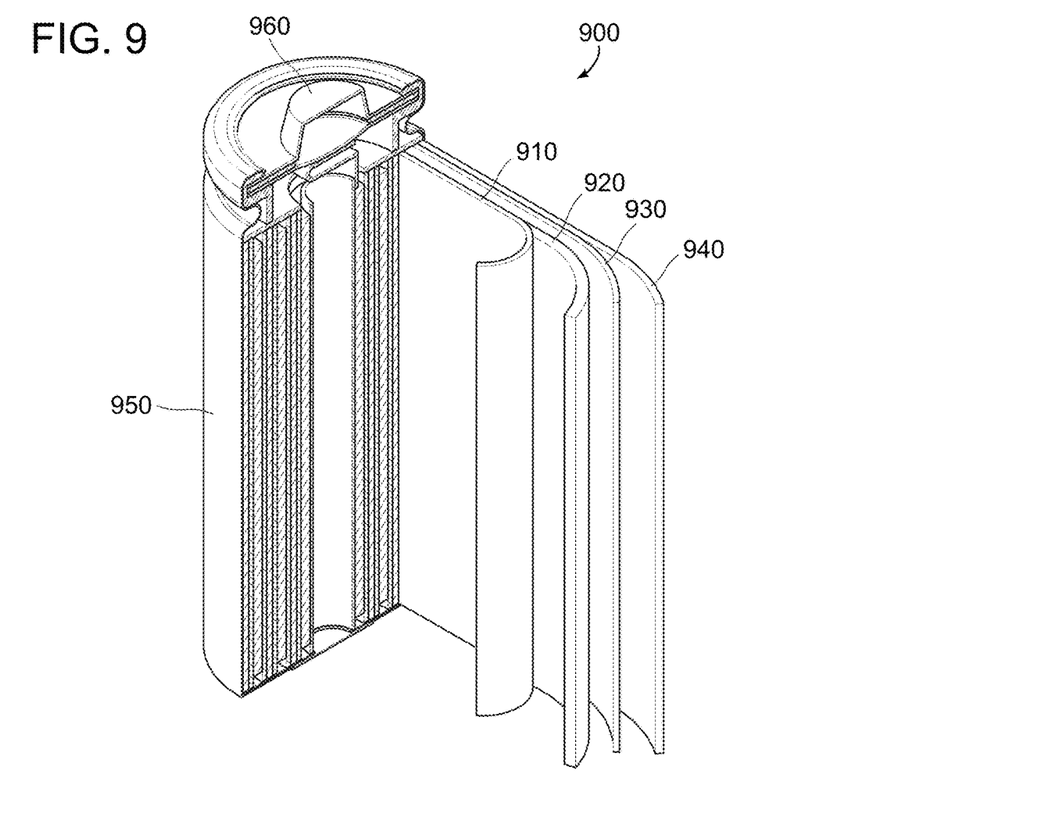
FIG. 9 is a schematic illustration of an aspect of a battery.

A battery may be manufactured by providing a negative electrode; providing a positive electrode; and disposing an electrolyte between the positive electrode and the negative electrode. In an aspect, the electrolyte may be a solid state electrolyte comprising the compound of Formula 1. In an aspect, a separator comprises the compound of Formula 1. In an aspect the negative active material, e.g., lithium metal, or the positive active material are protected by a layer comprising the compound of Formula 1. An aspect of the lithium battery is shown in FIG. 9, which illustrates schematically a battery 900 comprising a negative electrode 910, a solid electrolyte 920, an optional separator 930 and a positive electrode 940. The electrode assembly may be disposed in a can 950 having a header 960.

The compound of Formula 1 may be synthesized by combining, for example, Li$_2$CO$_3$, La(OH)$_3$, HfO$_2$, a compound comprising Ma if Ma is present, a compound comprising Mb if Mb is present, and a lithium salt comprising a halogen if a halogen is present, in suitable stoichiometric amount. For example, if Ma or Mb is Mg, magnesium carbonate or magnesium oxide may be used. If Ma or Mb is Al, Al$_2$(CO$_3$)$_3$ may be used. Also, if X is F, LiF may be used, or if X is Cl, LiCl may be used. The mixture can be heat treated in a suitable container, such as a crucible, at temperature between 700° C. and 1000° C. for two to 10 hours in air. The resulting material can ground into a fine powder using a ball-mill for 30 minutes. If desired, a wet process, such as wet-milling in methanol may be used. The dried powder can again be treated at an appropriate temperature between 700° C. and 1000° C. for 2 to 24 hours to provide the desired phase. The product may be reground, e.g., by ball-milling if desired, to provide a suitable form. The particle size of the ball-milled powder can be smaller than 1 μm, or smaller than 5 μm. The ball-milled powder can be mixed with a suitable amount of a 3 weight percent (wt %) polyvinylalcohol (PVA) solution if desired, or pressed into a pellet without the PVA at a pressure between 1 and 10 tons. The pellet can be sintered for 2 to 4 hours in air at a temperature ranging from 1000° C. to 1300° C.

In an aspect, a film comprising the compound of Formula 1 can be provided on a release layer, the film disposed on at least one of the negative electrode and the positive electrode, the release layer removed, and then the negative electrode disposed on the positive electrode to manufacture the battery.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

EXAMPLES

Example 1

Phase Stability

The stability of the compounds listed in Table 1 was evaluated by determining their energy above hull. Compounds having an energy above hull of less than 50 milli-electron volts (meV) per atom at a temperature between 450° C. to 1200° C. are observed to be stable and included in Table 1. The energy above hull is a measure of the energy penalty paid to dope the structure.

TABLE 1

| Dopant | Composition | Energy above hull (meV/atom) | Possible impurity phases during synthesis |
|---|---|---|---|
| None | $La_7La_3Hf_2O_{12}$ | 9.8 | |
| Al | $Li_{6.625}La_3Hf_2Al_{0.125}O_{12}$ | 16.6 | $Li_5AlO_4$; $Li_6Hf_2O_7$; $La_2O_3$ |
| | $Li_{6.25}La_3Hf_2Al_{0.25}O_{12}$ | 21.0 | $LiAlO_2$; $Li_6Hf_2O_7$; $La_2O_3$ |
| | $Li_{5.875}La_3Hf_2Al_{0.375}O_{12}$ | 18.9 | $LiAlO_2$; $La_2Hf_2O_7$; $Li_6Hf_2O_7$; $La_2O_3$ |
| | $Li_{5.5}La_3Hf_2Al_{0.5}O_{12}$ | 20.8 | $LiAlO_2$; $La_2Hf_2O_7$; $Li_6Hf_2O_7$; $La_2O_3$ |
| Ga | $Li_{6.625}La_3Hf_2Ga_{0.125}O_{12}$ | 16.9 | $Li_5GaO_4$; $Li_6Hf_2O_7$; $La_2O_3$ |
| | $Li_{6.25}La_3Hf_2Ga_{0.25}O_{12}$ | 21.3 | $LiGaO_2$; $Li_6Hf_2O_7$; $La_2O_3$ |
| | $Li_{5.875}La_3Hf_2Ga_{0.375}O_{12}$ | 19.1 | $LiGaO_2$; $Li_6Hf_2O_7$; $La_2Hf_2O_7$; $La_2O_3$ |
| | $Li_{5.5}La_3Hf_2Ga_{0.5}O_{12}$ | 21.3 | $LiGaO_2$; $La_2Hf_2O_7$; $Li_6Hf_2O_7$; $La_2O_3$ |
| Ta | $Li_{6.875}La_3Hf_{1.875}Ta_{0.125}O_{12}$ | 13.3 | $Li_5TaO_5$; $Li_6Hf_2O_7$; $Li_2O$ $La_2O_3$ |
| | $Li_{6.75}La_3Hf_{1.75}Ta_{0.25}O_{12}$ | 16.2 | $Li_5TaO_5$; $Li_6Hf_2O_7$; $Li_2O$ $La_2O_3$ |
| | $Li_{6.625}La_3Hf_{1.625}Ta_{0.375}O_{12}$ | 16.5 | $Li_5TaO_5$; $Li_6Hf_2O_7$; $Li_3TaO_4$; $La_2O_3$ |
| | $Li_{6.5}La_3Hf_{1.5}Ta_{0.5}O_{12}$ | 15.0 | $Li_5TaO_5$; $Li_6Hf_2O_7$; $Li_3TaO_4$; $La_2O_3$ |
| | $Li_{6.375}La_3Hf_{1.375}Ta_{0.625}O_{12}$ | 17.0 | $Li_5TaO_5$; $Li_6Hf_2O_7$; $Li_3TaO_4$; $La_2O_3$ |
| | $Li_{6.25}La_3Hf_{1.25}Ta_{0.75}O_{12}$ | 18.8 | $Li_5TaO_5$; $Li_6Hf_2O_7$; $Li_3TaO_4$; $La_2O_3$ |
| Nb | $Li_{6.875}La_3Hf_{1.875}Nb_{0.125}O_{12}$ | 12.5 | $Li_8Nb_2O_9$; $Li_6Hf_2O_7$; $Li_2O$; $La_2O_3$ |
| | $Li_{6.75}La_3Hf_{1.75}Nb_{0.25}O_{12}$ | 16.5 | $Li_8Nb_2O_9$; $Li_6Hf_2O_7$; $Li_2O$; $La_2O_3$ |
| | $Li_{6.625}La_3Hf_{1.625}Nb_{0.375}O_{12}$ | 16.3 | $Li_8Nb_2O_9$; $Li_6Hf_2O_7$; $La_2O_3$ |
| | $Li_{6.5}La_3Hf_{1.5}Nb_{0.5}O_{12}$ | 17.5 | $Li_8Nb_2O_9$; $Li_6Hf_2O_7$; $La_2O_3$ |
| | $Li_{6.375}La_3Hf_{1.375}Nb_{0.625}O_{12}$ | 20.1 | $Li_8Nb_2O_9$; $Li_6Hf_2O_7$; $Li_3NbO_4$; $La_2O_3$ |
| | $Li_{6.25}La_3Hf_{1.25}Nb_{0.75}O_{12}$ | 22.1 | $Li_8Nb_2O_9$; $Li_6Hf_2O_7$; $Li_3NbO_4$; $La_2O_3$ |
| W | $Li_{6.75}La_3Hf_{1.875}W_{0.125}O_{12}$ | 14.2 | $Li_6Hf_2O_7$; $Li_2O$; $Li_4WO_5$; $La_2O_3$ |
| | $Li_{6.5}La_3Hf_{1.75}W_{0.25}O_{12}$ | 19.0 | $Li_6Hf_2O_7$; $Li_2O$; $Li_4WO_5$; $La_2O_3$ |
| | $Li_{6.25}La_3Hf_{1.625}W_{0.375}O_{12}$ | 20.7 | $Li_6Hf_2O_7$; $Li_6Hf_2O_7$; $Li_4WO_5$; $La_2O_3$ |
| | $Li_6La_3Hf_{1.5}W_{0.5}O_{12}$ | 27.0 | $Li_6Hf_2O_7$; $Li_6Hf_2O_7$; $Li_4WO_5$; $La_2O_3$ |
| F | $Li_{6.875}La_3Hf_2O_{11.875}F_{0.125}$ | 15.1 | $Li_6Hf_2O_7$; $La_2O_3$; $Li2O$ $LiF$ |
| | $Li_{6.75}La_3Hf_2O_{11.75}F_{0.25}$ | 20.0 | $Li_6Hf_2O_7$; $La_2O_3$; $Li2O$ $LiF$ |
| | $Li_{6.625}La_3Hf_2O_{11.625}F_{0.375}$ | 23.8 | $Li_6Hf_2O_7$; $La_2O_3$; $Li2O$ $LiF$ |
| | $Li_{6.5}La_3Hf_2O_{11.5}F_{0.5}$ | 27.6 | $Li_6Hf_2O_7$; $La_2O_3$; $LiF$ |
| | $Li_{6.375}La_3Hf_2O_{11.375}F_{0.625}$ | 32.3 | $Li_6Hf_2O_7$; $La_2O_3$; $LiF$; $Li_6Hf_2O_7$ |

TABLE 1-continued

| Dopant | Composition | Energy above hull (meV/atom) | Possible impurity phases during synthesis |
|---|---|---|---|
| | $Li_{6.25}La_3Hf_2O_{11.25}F_{0.75}$ | 36.7 | $Li_6Hf_2O_7$; $La_2O_3$; LiF; $La_6Hf_2O_7$ |
| | $Li_{6.125}La_3Hf_2O_{11.125}F_{0.875}$ | 40.8 | $Li_6Hf_2O_7$; $La_2O_3$; LiF; $La_6Hf_2O_7$ |
| | $Li_6La_3Hf_2O_{11}F$ | 44.8 | $Li_6Hf_2O_7$; $La_2O_3$; LiF; $La_6Hf_2O_7$ |
| Al and Zr | $Li_{6.625}La_3HfZrAl_{0.125}O_{12}$ | 14.9 | $Li_5AlO_4$; $Li_6Zr_2O_7$; $La_2O_3$; $Li_6Hf_2O_7$ |
| | $Li_{6.25}La_3HfZrAl_{0.25}O_{12}$ | 19.2 | $LiAlO_2$; $Li_6Zr_2O_7$; $La_2O_3$; $Li_6Hf_2O_7$ |
| | $Li_{5.875}La_3HfZrAl_{0.375}O_{12}$ | 19.4 | $LiAlO_2$; $Li_6Zr_2O_7$; $La_2O_3$; $La_2Zr_2O_7$; $Li_6Hf_2O_7$ |
| | $Li_{5.5}La_3HfZrAl_{0.5}O_{12}$ | 19.2 | $LiAlO_2$; $Li_6Zr_2O_7$; $La_2O_3$; $La_2Zr_2O_7$; $Li_6Hf_2O_7$ |
| Ta and Zr | $Li_{6.75}La_3Hf_{0.875}Zr_{0.875}Ta_{0.25}O_{12}$ | 13.8 | $Li_5TaO_5$; $Li_6Hf_2O_7$; $Li_6Hf_2O_7$; $Li_2O$; $La_2O_3$ |
| | $Li_{6.5}La_3Hf_{0.75}Zr_{0.75}Ta_{0.5}O_{12}$ | 13.4 | $Li_5TaO_5$; $Li_6Zr_2O_7$; $Li_6Hf_2O_7$; $Li_3TaO_4$; $La_2O_3$ |
| | $Li_{6.25}La_3Hf_{0.625}Zr_{0.625}Ta_{0.75}O_{12}$ | 17.4 | $Li_5TaO_5$; $Li_6Zr_2O_7$; $Li_6Hf_2O_7$; $Li_3TaO_4$; $La_2O_3$ |

Example 2

Activation Energy and Ionic Conductivity

Figure 1:
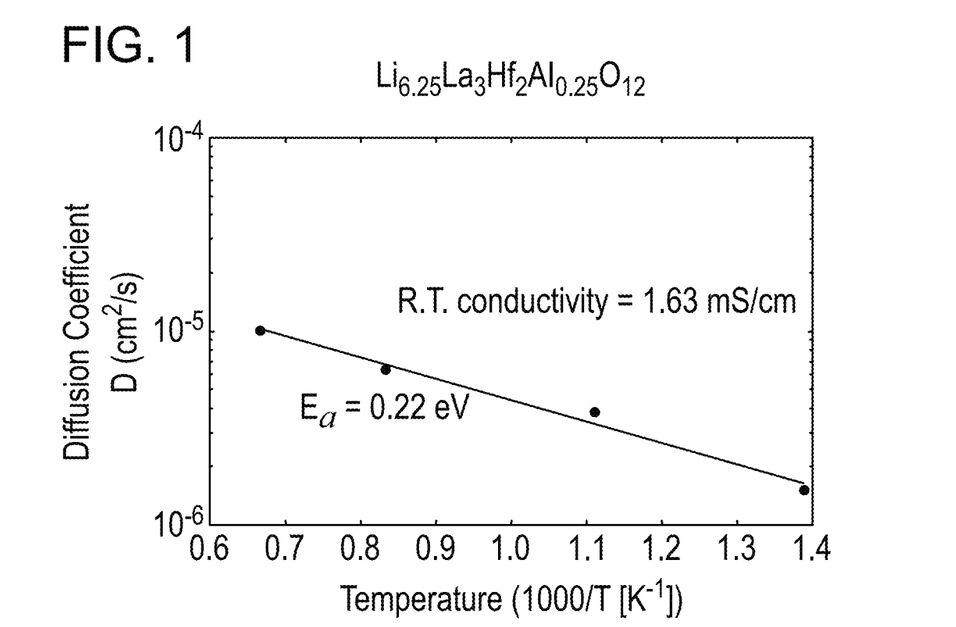
FIG. 1 is a graph of diffusivity (square centimeters per second) versus inverse temperature (1/Kelvin) illustrating the activation energy and conductivity of the composition $Li_{6.25}La_3Hf_2O_{11.75}F_{0.25}$.

The activation energy and ionic conductivity was determined for selected compositions by ab-initio molecular dynamics. FIG. 1 is graph of diffusivity versus the inverse of temperature for $Li_{6.25}La_3Hf_2Al_{0.25}O_{12}$. As shown in FIG. 1, the activation energy is 0.22 electron-volts (eV) and the conductivity at 300K is 1.63 milliSiemens per centimeter (mS/cm).

Figure 2:
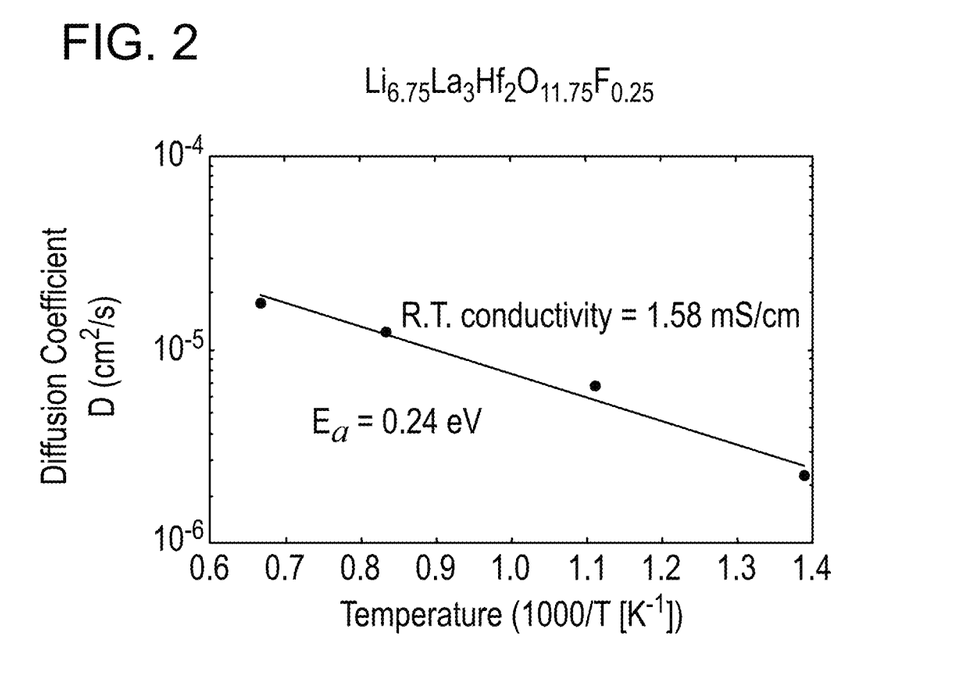
FIG. 2 is a graph of diffusivity (square centimeters per second) versus inverse temperature (1/Kelvin) illustrating the activation energy and conductivity of the composition $Li_{6.75}La_3Hf_2O_{11.75}F_{0.25}$.

FIG. 2 is a graph of diffusivity versus the inverse of temperature for $Li_{6.75}La_3Hf_2O_{11.75}F_{0.25}$. As shown in FIG. 2, the activation energy is 0.24 eV and the conductivity at 300K is 1.58 mS/cm.

Figure 3:
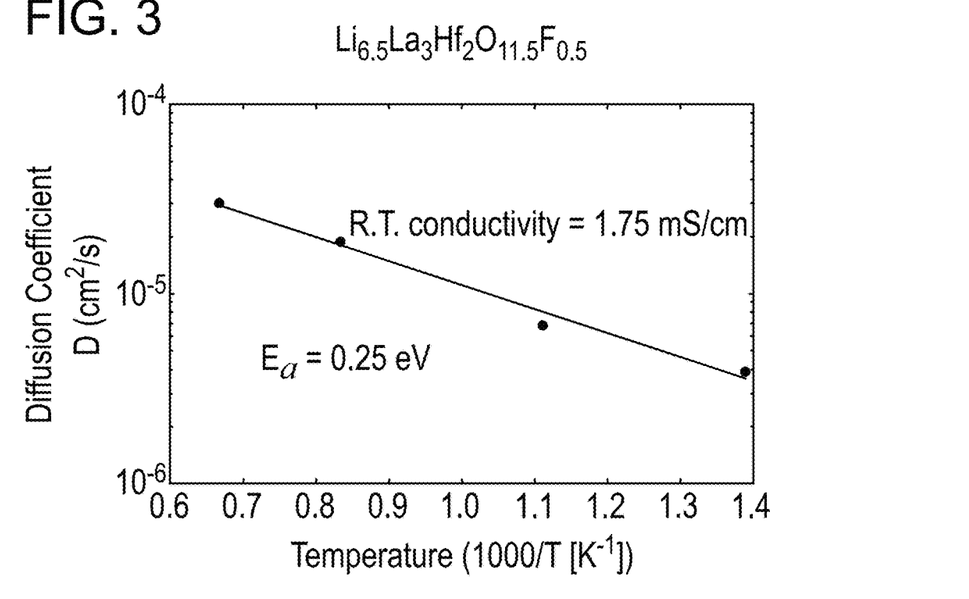
FIG. 3 is a graph of diffusivity (square centimeters per second) versus inverse temperature (1/Kelvin) illustrating the activation energy and conductivity of the composition $Li_{6.5}La_3Hf_2O_{11.5}F_{0.5}$.

FIG. 3 is a graph of diffusivity versus the inverse of temperature for $Li_{6.5}La_3Hf_2O_{11.5}F_{0.5}$. As shown in FIG. 3, the activation energy is 0.25 eV and the conductivity at 300K is 1.75 mS/cm.

Example 3

Electrochemical Stability

Figure 4:
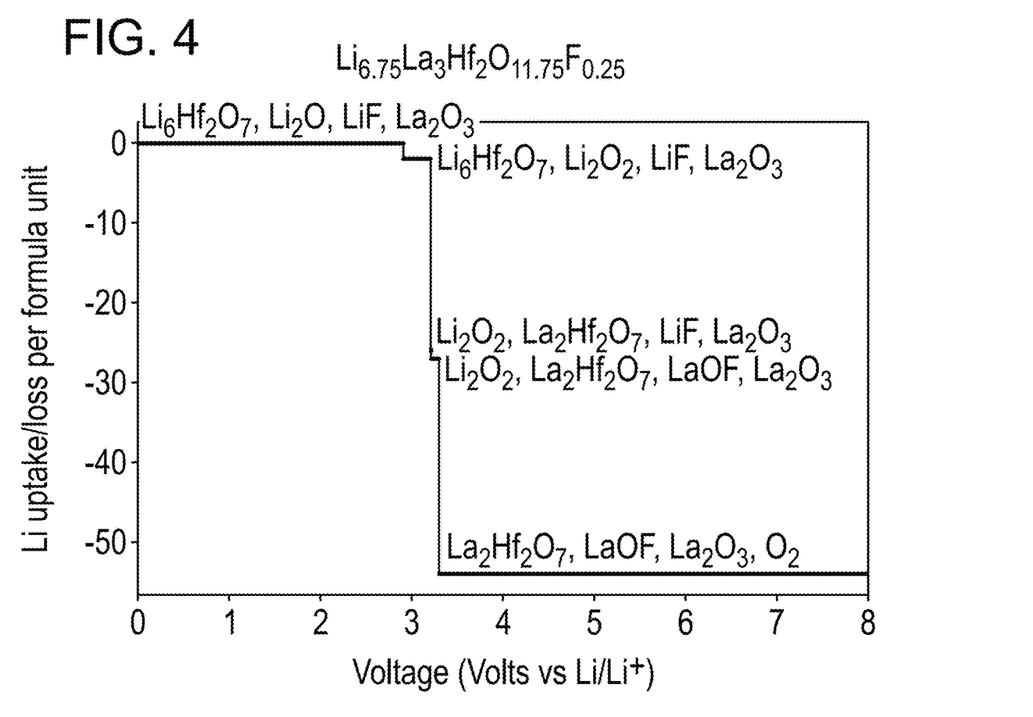
FIG. 4 is a graph of lithium uptake or loss per formula unit versus voltage (Volts versus Li/Li+) illustrating the stability of $Li_{6.75}La_3Hf_2O_{11.75}F_{0.25}$ between 0 and 3.2 volts versus Li/Li−.
Figure 5:
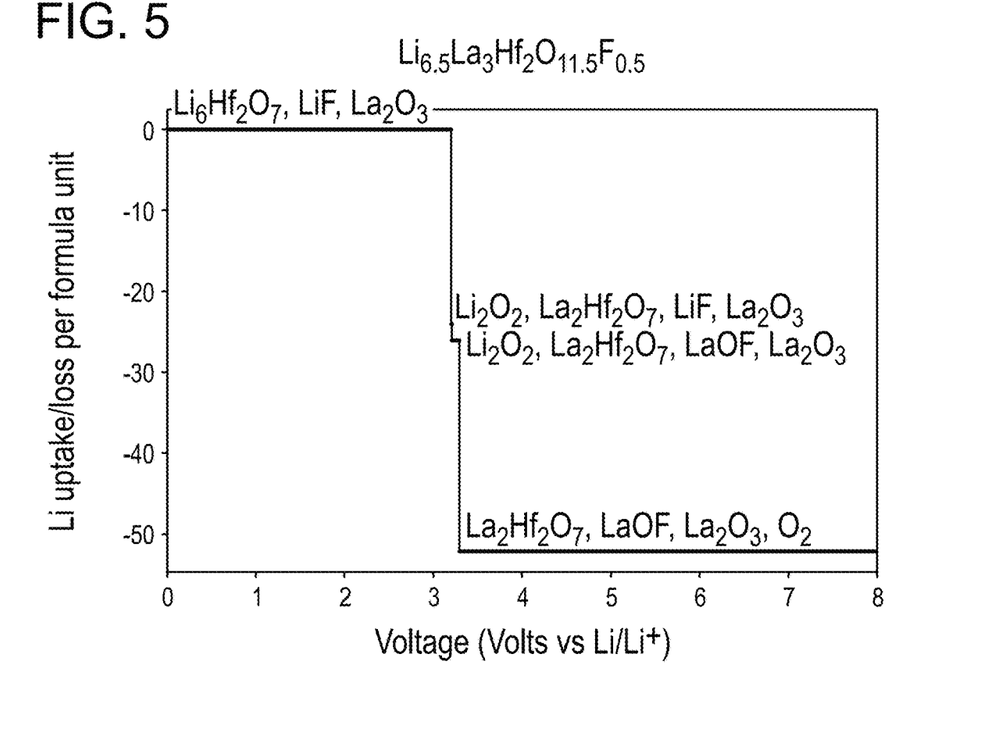
FIG. 5 is a graph of lithium uptake or loss per formula unit versus voltage (Volts versus Li/Li+) illustrating the stability of $Li_{6.5}La_3Hf_2O_{11.5}F_{0.5}$ between 0 and 3.2 volts versus Li/L+.
Figure 6:
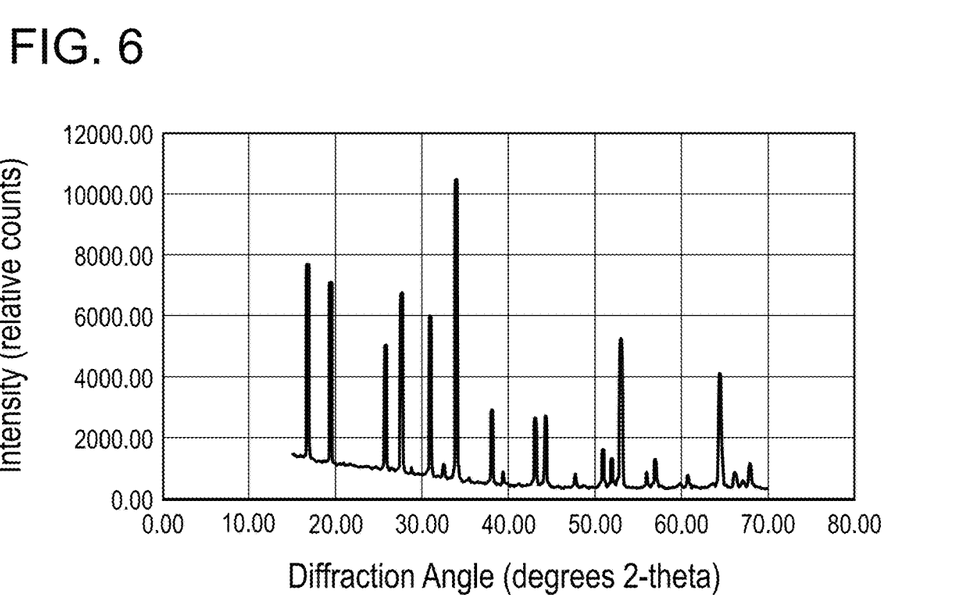
FIG. 6 is a graph of intensity (relative counts) versus diffraction angle (degrees 2-theta) for the $Li_{6.55}La_3Hf_{1.55}Ta_{0.45}O_{12}$ product of Example 4.

The electrochemical stability of selected compositions was determined through analysis using the lithium grand potential phase diagram for the compositions $Li_{6.75}La_3Hf_2O_{11.75}F_{0.25}$ and $Li_{6.75}La_3Hf_2O_{11.75}F_{0.5}$. The grand potential phase diagram gives the stability of the solid electrolyte materials in contact with a lithium sink (charged cathode) or source (anode), each of which contains lithium at a given chemical potential. Shown in FIG. 4 is a graph of lithium uptake or loss per formula unit versus voltage for $Li_{6.75}La_3Hf_2O_{11.75}F_{0.25}$. FIG. 5 is a graph of lithium uptake or loss per formula unit versus voltage for $Li_{6.5}La_3Hf_2O_{11.5}F_{0.5}$. As shown in FIGS. 5 and 6, both $Li_{6.75}La_3Hf_2O_{11.75}F_{0.25}$ and $Li_{6.5}La_3Hf_2O_{11.5}F_{0.5}$ are intrinsically stable to lithium metal at 0 volts versus $Li/Li^-$. Also, $Li_{6.75}La_3Hf_2O_{11.75}F_{0.25}$ is intrinsically stable to 3.0 V versus $Li/Li^+$, and $Li_{6.5}La_3Hf_2O_{11.5}F_{0.5}$ is intrinsically stable to 3.2 V versus $Li/Li^+$.

Example 4

Synthesis of $Li_{6.55}La_3Hf_{1.55}Ta_{0.45}O_{12}$ $Li_2CO_3$, $La(OH)_3$, $HfO_2$, and $Ta_2O_5$ are used as received. A mixture of stoichiometric amounts of the $Li_2CO_3$, $La(OH)_3$, $HfO_2$, and $Ta_2O_5$ for $Li_{6.55}La_3Hf_{1.55}Ta_{0.45}O_{12}$ are dry-ball milled for 30 minutes at 1725 rpm with 12 mm YSZ balls. The resulting material is calcined at 950° C. for 12 hours in air. The calcined product is ground, and then uniaxially pressed into a pellet, covered with a mother powder and sintered at 1100° C. for 4 hour in air. The "mother powder" refers to a powder having the same composition but is not repeatedly used (i.e., it is not used for more than one experiment) to prevent loss of lithium.

The product was analyzed by X-ray powder diffraction. Shown in FIG. 6 is a graph of intensity versus diffraction angle for the sintered product.

Example 5

Synthesis of $Li_{6.25}Hf_2La_3Mg_{0.375}O_{12}$ $Li_2CO_3$, $La(OH)_3$, $HfO_2$, and MgO are used as received. A mixture of stoichiometric amounts of the $Li_2CO_3$, $La(OH)_3$, $HfO_2$, and MgO for $Li_{6.25}Hf_2La_3Mg_{0.375}O_{12}$ are dry-ball milled for 30 minutes at 1725 rpm with 12 mm YSZ balls. The resulting material is calcined at 950° C. for 12 hours in air. The calcined product is ground, and then uniaxially pressed into a pellet, covered with a mother powder and sintered at 1100° C. for 4 hours in air.

Figure 7:
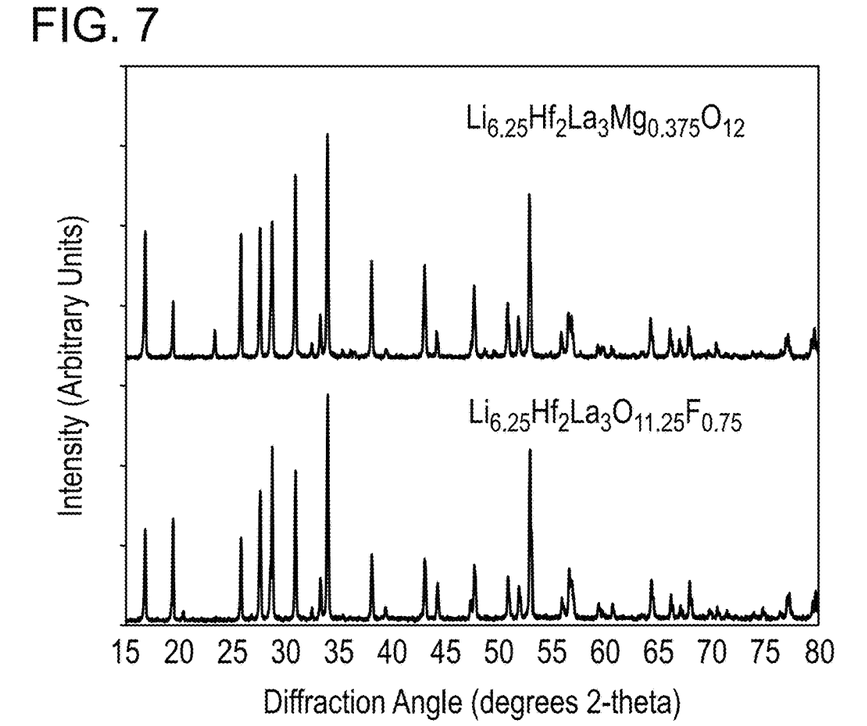
FIG. 7 is a graph of intensity (arbitrary units) versus diffraction angle (degrees 2-theta) for the $Li_{6.25}La_3Hf_2Mg0.375O_{12}$ product of Example 5 and the $Li_{6.25}Hf_2La_3O_{11.25}F_{0.75}$ product of Example 6.

The product was analyzed by X-ray powder diffraction. Shown in FIG. 7 is a graph if intensity versus diffraction angle for the sintered product.

Figure 8A:
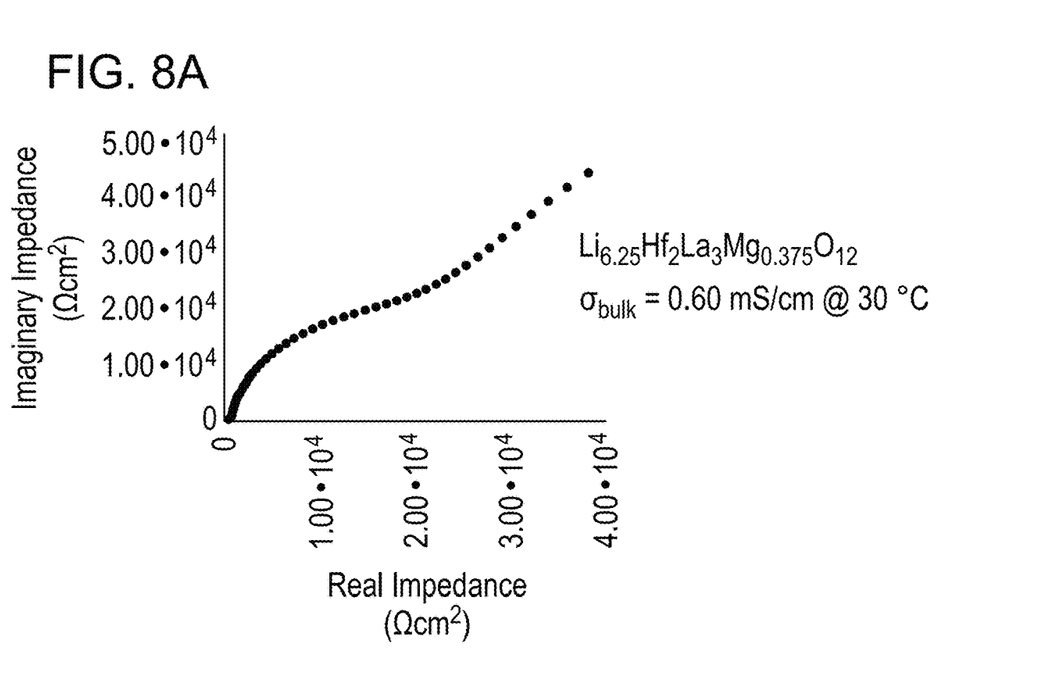
FIGS. 8A and 8B are each a graph of imaginary resistance ($Z_2$, ohms-square centimeters, $\Omega cm^2$) versus real resistance ($Z_1$, ohms-square centimeters, $\Omega cm^2$) which shows the results of impedance analysis of the $Li_{6.25}La_3Hf_2Mg0.375O_{12}$ product of Example 5 and the $Li_{6.25}Hf_2La_3O_{11.25}F_{0.75}$ product of Example 6, respectively.

Bulk conductivity was determined by impedance spectroscopy. The product was found to have a bulk conductivity ($\sigma_{bulk}$) of 0.60 mS/cm at 30° C., as shown in FIG. 8A.

Example 6

Synthesis of $Li_{6.25}Hf_2La3O_{11.25}F_{0.75}$ $Li_2CO_3$, $La(OH)_3$, $HfO_2$, and LiF are used as received. A mixture of stoichiometric amounts of the $Li_2CO_3$, $La(OH)_3$, $HfO_2$, and LiF for $Li_{6.25}Hf_2La_3O_{11.25}F_{0.75}$ are dry-ball milled for 30 minutes at 1725 rpm with 12 mm YSZ balls. The resulting material is calcined at 950° C. for 12 hours in air. The calcined product is ground, and then uniaxially pressed into a pellet, covered with a mother pwder and sintered at 1100° C. for 4 hours in air.

The product was analyzed by X-ray powder diffraction. Shown in FIG. 7 is a graph if intensity versus diffraction angle for the sintered product.

Figure 8B:
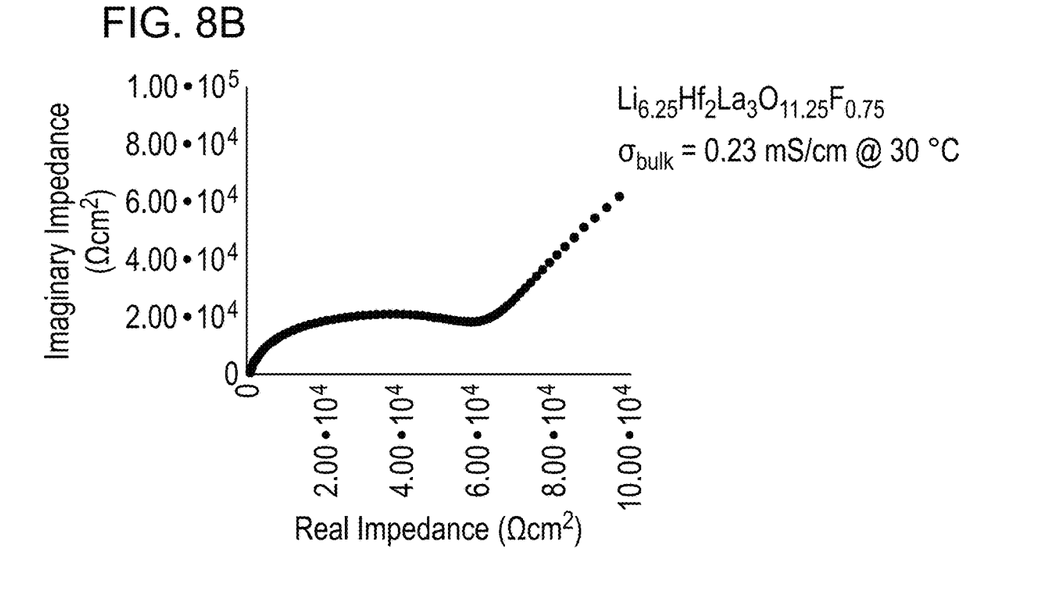

Bulk conductivity was determined by impedance spectroscopy. The product was found to have a bulk conductivity ($\sigma_{bulk}$) of 0.23 mS/cm at 30° C., as shown in FIG. 8B.

What is claimed is:

1. A solid state electrolyte comprising a compound of Formula 1

$$Li_{7-a*\alpha-(b-4)*\beta-x}M^a{}_\alpha La_3Hf_{2-\beta}M^b{}_\beta O_{12-x-\delta}X_x \quad (1)$$

wherein $M^a$ is a cationic element having a valence of a+;
$M^b$ is a cationic element having a valence of b+; and
X is an anion having a valence of −1,
wherein, when $M^a$ comprises H, $0<\alpha \leq 5$, otherwise $0<\alpha \leq 0.75$, and
wherein $0\leq \beta \leq 1.5$, $0<x\leq 1.5$, and $(a*\alpha+(b-4)\beta+x)>0$, $0\leq \delta \leq 1$.

2. The solid state electrolyte of claim 1, wherein a Li crystallographic site comprises $M^a$ disposed thereon.

3. The solid state electrolyte of claim 1, wherein $M^a$ is a monovalent element, a divalent element, a trivalent element, or a tetravalent element.

4. The solid state electrolyte of claim 2, wherein a is 1 and $M^a$ is monovalent and is H, Na, K, Rb, or a combination thereof.

5. The solid state electrolyte of claim 2, wherein a is 2 and $M^a$ is divalent and is Be, Mg, Ca, Sr, Ba, or a combination thereof.

6. The solid state electrolyte of claim 2, wherein a is 3, and $M^a$ is trivalent and is B, Al, Ga, In, Sc, Y, La, Ce, Pr, Nd, or a combination thereof.

7. The solid state electrolyte of claim 2, wherein a is 4, and $M^a$ is tetravalent and is Zr, Ti, Sn, Si, Ge, Pb, or a combination thereof.

8. The solid state electrolyte of claim 1, wherein a Hf crystallographic site comprises $M^b$ disposed thereon.

9. The solid state electrolyte of claim 1, wherein $M^b$ is a divalent element, a trivalent element, a tetravalent element, or a pentavalent element.

10. The solid state electrolyte of claim 9, wherein b is 2 and $M^b$ is divalent and is Be, Mg, Ca, Sr, Ba, or a combination thereof.

11. The solid state electrolyte of claim 9, wherein b is 3 and $M^b$ is trivalent and is B, Al, Ga, In, Sc, Y, La, Ce, Pr, Nd, or a combination thereof.

12. The solid state electrolyte of claim 9, wherein b is 4 and $M^b$ is tetravalent and is Zr, Ti, Sn, Si, Ge, Pb, or a combination thereof.

13. The solid state electrolyte of claim 9, wherein b is 5 and $M^b$ is pentavalent and is V, Ta, Nb, or a combination thereof.

14. The solid state electrolyte of claim 9, wherein b is 6 and $M^b$ is hexavalent and is Cr, Mo, W, or a combination thereof.

15. The solid state electrolyte of claim 1, wherein $M^a$ and $M^b$ are different.

16. The solid state electrolyte of claim 1, wherein X is F.

17. The solid state electrolyte of claim 1, wherein $M^b$ is Zr, and wherein the solid state electrolyte is in the form of a particle wherein a ratio of a concentration of Hf to Zr on a surface of the particle is greater than a ratio of a concentration of Hf to Zr in a center of the particle.

18. The solid state electrolyte of claim 1, wherein $M^b$ is Zr, and wherein the solid state electrolyte is in the form of a particle wherein a concentration of Hf increases in a direction from a center of the particle to a surface of the particle.

19. A particle comprising:
the solid state electrolyte of claim 1; and
a liquid electrolyte within a pore of the particle.

20. A solid state electrolyte comprising:
a core comprising a first solid state electrolyte; and
a shell comprising the compound of claim 1 on the core, wherein the first solid state electrolyte and the compound of Formula 1 are different.

21. A porous separator for a battery, the separator comprising:
a porous substrate, and
the compound of claim 1 on the substrate.

22. A protected negative electrode, the electrode comprising lithium metal and the solid state electrolyte of claim 1 directly on the lithium metal.

23. A positive active material for a lithium battery, the positive active material comprising:
a lithium transition metal oxide; and
the solid state electrolyte of claim 1 on the lithium transition metal oxide.

24. A battery comprising:
a positive electrode;
a negative electrode; and
the solid state electrolyte of claim 1 between the positive electrode and the negative electrode.

25. A solid state electrolyte comprising a compound of the formula $$Li_{7-a*\alpha-(b-4)*\beta-x}M^a{}_\alpha La_3Hf_{2-\beta}M^b{}_\beta O_{12-x-\delta}F_x$$

wherein
$M^a$ is a cationic element having a valence of a+;
$M^b$ is a cationic element having a valence of b+; and
wherein, when $M^a$ comprises H, $0<\alpha \leq 5$, otherwise $0<\alpha \leq 0.75$, and
wherein $0\leq \beta \leq 1.5$, $0<x\leq 1.5$, and $(a*\alpha+(b-4)\beta+x)>0$, $0\leq \delta \leq 1$.

* * * * *